US010535034B2

(12) United States Patent
Zhang et al.

(10) Patent No.: US 10,535,034 B2
(45) Date of Patent: Jan. 14, 2020

(54) ITEM DELIVERY MANAGEMENT SYSTEMS AND METHODS

(71) Applicant: MASTERCARD ASIA/PACIFIC PTE. LTD., Singapore (SG)

(72) Inventors: Jie Zhang, Singapore (SG); Donghao Huang, Singapore (SG); Tobias Puehse, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 210 days.

(21) Appl. No.: 15/680,940

(22) Filed: Aug. 18, 2017

(65) Prior Publication Data

US 2018/0053147 A1 Feb. 22, 2018

(30) Foreign Application Priority Data

Aug. 19, 2016 (SG) .......................... 10201606948X (51) Int. Cl.
*G06Q 10/08* (2012.01)
(52) U.S. Cl.
CPC ....... *G06Q 10/0832* (2013.01); *G06Q 10/087* (2013.01)

(58) Field of Classification Search
USPC ........................................................ 705/28
See application file for complete search history.

(56) References Cited

U.S. PATENT DOCUMENTS

2015/0242806 A1\* 8/2015 Cousins ............... G06Q 10/087
700/237

\* cited by examiner

*Primary Examiner* — Garcia Ade
(74) *Attorney, Agent, or Firm* — Harness, Dickey & Pierce, P.L.C.

(57) ABSTRACT

Disclosed herein is a system for managing item delivery. The system includes an order management system, comprising an order terminal for receiving an order, a transmitter for receiving the order from the order terminal and sending the order to one or more product providers, a verification terminal by which a recipient can verify completion of delivery of items associated with the order, and a scheduler. The scheduler schedules a robot to be available at an interchange to receive the one or more items, and the order management system provides a delivery destination to the robot by which, or so that, the robot can autonomously navigate to the destination.

19 Claims, 5 Drawing Sheets

ITEM DELIVERY MANAGEMENT SYSTEMS AND METHODS

CROSS-REFERENCE TO RELATED APPLICATION

This application claims the benefit of and priority to Singapore Patent Application No. 10201606948X filed Aug. 19, 2016. The entire disclosure of the above application is incorporated herein by reference.

FIELD

The present disclosure relates to systems and methods for managing delivery of an item to a destination.

BACKGROUND

This section provides background information related to the present disclosure which is not necessarily prior art.

Technologies exist by which autonomous robots are used to deliver goods from a store room to a particular destination, such as a hotel room. One such technology is disclosed in United States patent publication no. 2015/0242806, entitled "ENTRYWAY BASED AUTHENTICATION SYSTEM", the entire content of which is incorporated herein by reference.

These technologies rely on store rooms and stock rooms being suitably configured to load the autonomous robot. For example, store room racks may be specifically designed to place articles, such as towels, into a receptacle of a robot.

The store room racks are specifically designed to deliver a known article into a known position on or in the robot. Since the store room racks are designed with a particular product in mind, such technologies do not readily adapt for use with articles of unknown size, shape, weight and orientation.

In addition, the robot may assume the store room contains sufficient stock and thus can collect the relevant articles whenever the robot is available to do so. Such technologies therefore do not readily adapt to cases where store rooms do not routinely carry the relevant articles and thus the availability of those articles cannot be assumed to match the availability of the robot seeking to pick them up.

It would be useful to provide an alternative technology that removes or reduces one or more of the aforementioned problems.

SUMMARY

This section provides a general summary of the disclosure, and is not a comprehensive disclosure of its full scope or all of its features. Aspects and embodiments of the disclosure are set out in the accompanying claims.

The present disclosure provides a system for managing item delivery, comprising an order management system, where the order management system comprises: an order terminal for receiving an order, the order comprising a request for delivery of one or more items to a destination; a transmitter for receiving the order from the order terminal and sending the order to one or more product providers for providing the one or more items; a verification terminal by which a recipient can verify completion of delivery of the one or more items to the destination; and a scheduler. The system for managing item delivery also comprises a delivery interchange at which delivery of the one or more items is taken from a transport entity, the transport entity receiving the one or more items from the one or more product providers; and an autonomous delivery robot for receiving the one or more items at the delivery interchange and delivering the one or more items to the destination, wherein the scheduler schedules the robot to be available at the interchange to receive the one or more items, and the order management system provides the destination to the robot by which the robot can autonomously navigate to the destination.

The present disclosure further provides a supply chain for delivering one or more items supplied by one or more product providers to a client of a host business, where the supply chain comprises the one or more product providers and an order management system comprising: an order terminal for receiving an order, the order comprising a request for delivery of the one or more items to a destination; a transmitter for sending the order to the one or more product providers; a verification terminal by which a recipient can verify completion of delivery of the one or more items to the destination; and a scheduler. The supply chain also comprises the host business and a transport entity for receiving the one or more items from the one or more product providers and delivering the one or more items to the host business. The host business comprises: an interchange for taking delivery of the one or more items from the one or more product providers; and an autonomous delivery robot for receiving the one or more items at the interchange and autonomously delivering the one or more items to the destination. And, the scheduler schedules the robot to be available at the interchange for receipt and delivery of the one or more items, and for providing destination location information to the robot by which the robot can autonomously navigate to the destination.

The present disclosure also provides a network for managing item delivery, where the network comprises an order management system, comprising: an order terminal for receiving an order, the order comprising a request for delivery of the one or more items to a destination; a transmitter for sending the order to one or more product providers of the one or more items; a verification terminal by which a recipient can verify completion of delivery of the one or more items to the destination; and a scheduler. The network also comprises a host, comprising: an interchange for taking delivery of the one or more items from the one or more product providers; and an autonomous delivery robot for receiving the one or more items at the interchange and autonomously delivering the one or more items to the destination. The network further comprises the one or more product providers for receiving the order and supplying the one or more items. The scheduler schedules the robot to be available at the interchange for receipt and delivery of the one or more items, and for providing destination location information to the robot by which the robot can autonomously navigate to the destination.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, some embodiments of the present disclosure will now be described by way of non-limiting example only, with reference to the accompanying drawings in which.

Corresponding reference numerals indicate corresponding parts throughout the several views of the drawings.

DETAILED DESCRIPTION

Embodiments of the present disclosure will be described, by way of example only, with reference to the drawings. Again, like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "analysing", "determining", "replacing", "generating", "initializing", "initiating", "receiving", "outputting", or the like, refer to the action and processes of a computer system, or similar electronic device such as a humanoid robot, that manipulates and transforms data represented as physical quantities within the computer system into other data similarly represented as physical quantities within the computer system or other information storage, transmission or display devices including display by gesture movement replicating movements of a human.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus, with the exception that gesture-related outputs and specific verbal, tonal outputs are intended to be produced on a humanoid robot. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the present disclosure.

Furthermore, one or more of the steps of the computer program may be performed in parallel rather than sequentially. Such a computer program may be stored on any computer readable medium. The computer readable medium may include storage devices, such as magnetic or optical disks, memory chips, or other storage devices suitable for interfacing with a computer. The computer readable medium may also include a hard-wired medium, such as exemplified in the Internet system, or wireless medium such as exemplified in the GSM mobile telephone system. The computer program, when loaded and executed on a robot and/or general-purpose computer interacting with a robot, effectively results in an apparatus that implements the steps of the preferred method.

Figure 1:
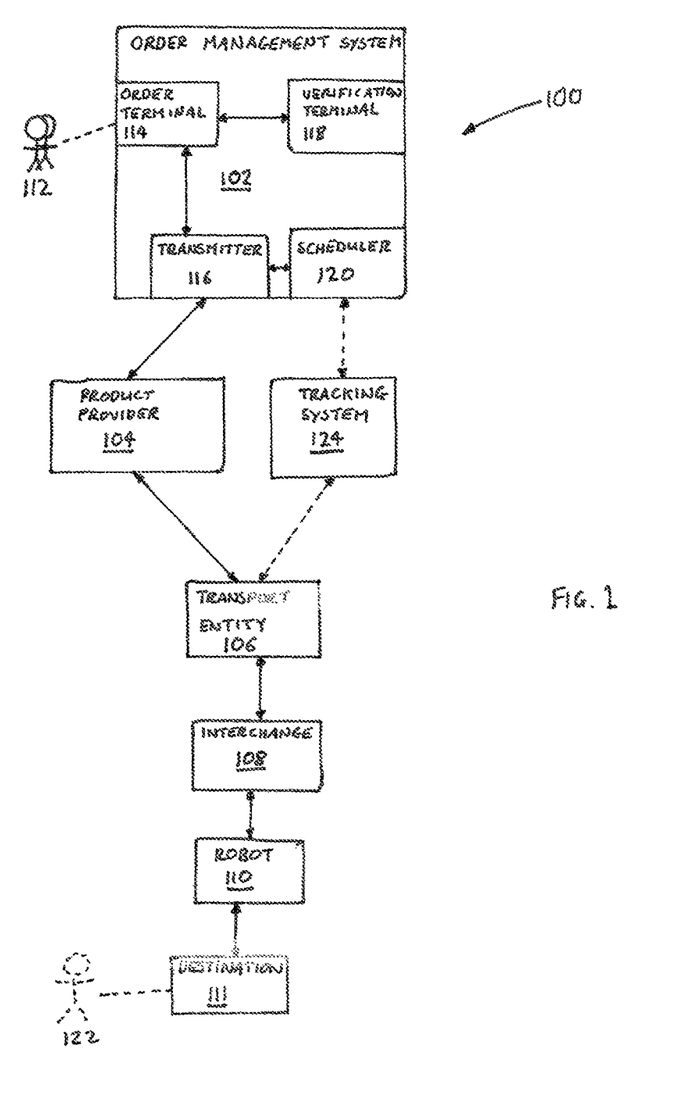
FIG. 1 shows a system for managing item delivery.

FIG. 1 shows a system 100 for managing item delivery. The system 100 broadly comprises:
an order management system 102;
a product provider 104;
a transport entity 106;
a delivery interchange 108; and
an autonomous delivery robot 110.

The order management system 102 manages the flow of information from a user 112 who places an order for one or more items or products (the terms "item" or "items" and "product" or "products" may be used interchangeably), to various entities involved in the delivery of that product or those products.

The order management system 102 comprises an order terminal 114, transmitter 116, verification terminal 118 and scheduler 120. The order terminal 114 receives the order for the one or more products. In addition to identifying the one or more products, the order specifies a destination or endpoint for the delivery.

The order terminal 114 may be any network-enabled device (i.e. a device capable of transmitting data across a network) through which a user 112 may place an order. The order terminal 114 may comprise a smartphone, tablet, surface-computing device, handheld digital assistant, laptop or any other suitable computing device.

The order may be placed through an app, webpage, kiosk or other interface or system through which orders for products can be placed. The order may also be placed through a web portal. For example, when the user wishes to have the one or more products delivered to a hotel room and is connected to the hotel network—such as through a Wi-Fi connection—the landing page of the hotel may comprise an order portal through which orders can be placed.

The web portal may permit access to only a selected merchant (i.e. provider) or merchants from whom orders can be placed. The orders so placed may be charged directly to a payment vehicle of the user 112. Alternatively, where the user 112 is staying in a hotel room and ordering over the hotel Wi-Fi or network, the order may be charged back to the user's hotel room.

The web portal may alternatively permit access to any merchant's website for placement of orders. Where the user 112 is in a hotel room the hotel Wi-Fi connection may be monitored to determine whether the user 112 is making a purchase (e.g. detection of when the user lands on a payment gateway). When the user 112 makes a purchase and specifies the hotel address, the order management system 102 may prepare to schedule an autonomous delivery robot 110 to perform delivery from the interchange 108 to the user's hotel room.

The order management system 102 may associate the order with the user's hotel room number so that the product provider 104 (also known as a product supplier) does not need to know the user's hotel room number. Instead, when the order arrives at the interchange 108 and a robot 110 is tasked with delivery of the order, the order management system 102 may map a receipt, order number or other identifier of the order to the user's hotel room number. The order management system 102 will then provide the robot 110 with the user's hotel room number so that delivery can be completed. In this manner, the user's hotel room number can remain secure.

The transmitter 116, which may comprise part of a transceiver, receives the order from the order terminal and sends the order to the product provider 104. The transmitter 116 may be any appropriate device for sending information, such as an Internet router or facsimile machine.

The verification terminal 118 is an electronic interface used by the recipient (e.g. user 112 or another party 122—the recipient is shown in broken lines as, oftentimes, the recipient will be the party placing the order and thus be referenced by numeral 112 in FIG. 1) to verify that the delivery has been made or completed—in other words, by which the recipient can confirm that the one or more items have been delivered to the destination identified in the order. The verification terminal 118 may also serve other functions such as:

confirming or making payment for the one or more products should be released; and to verify the identity of the recipient.

The recipient may be required to identify themselves at the verification terminal 118. This can be used to confirm the recipient is the party who placed the order, is an authorised representative (e.g., for reception personnel in an office building, who accept deliveries on behalf of those in their offices), the person under whom a hotel room is registered where delivery is made to the hotel room, or is otherwise a person authorised to accept the order. The recipient may identify themselves using biometric identification, such as fingerprint verification, facial recognition, iris recognition, palm recognition, speech recognition or another technology. The recipient may instead identify themselves using a signature, personal identification number, or any other identification details by which identity can typically be electronically verified. To that end, the verification terminal may comprise a biometric marker reader or an interface by which a user can input identification details.

The recipient may verify completion of delivery by confirming or making payment for the one or more products. This may occur where the order was placed online, with "payment on delivery" payments terms. To facilitate payment, the verification terminal 118 may comprise:

a magnetic stripe reader, EMV chip reader and/or near field communication (NFC) chip reader to facilitate payment using normal magnetic stripe, EMV chip and contactless (including NFC chip card, mobile NFC or magnetic secure transmission (MST)) methods, and may be configured to accept a signature so as to verify the user in the same manner as would occur in-store;

a biometric marker reader, such as a fingerprint scanner, camera associated with facial recognition technology, or voice recognition technology, to identify biometric characteristics of the recipient and make payment using a payment vehicle associated with the relevant biometric characteristics; and/or an interface by which the user can enter payment vehicle or identification details—in the former case, payment will be made using funds associated with the payment vehicle and, in the latter case, payment will be made using a payment vehicle associated with the relevant recipient identification details.

In some embodiments, a payment vehicle will be used to make payment at the time of ordering the one or more products. To ensure the recipient does not pay for a delivery that has not occurred and is thus incomplete (including taking delivery of damaged or unexpected goods, one or more items being absent or damaged, one or more items being delivered in an unexpected state—for example, hot foods being cold on arrival and cold foods being warm on arrival), funds sufficient to pay for the one or more items may be barred or a hold otherwise placed on them to ensure the funds are available upon successful completion of delivery. This similarly protects the product provider since payment for the one or more products is guaranteed provided there is successful completion of delivery.

To facilitate verification at the time of delivery, the autonomous delivery robot 110 may comprise the verification terminal 118. To that end, the order management system 102 may comprise the autonomous delivery robot 110.

The order management system 102 further comprises a scheduler 120. The scheduler 120 coordinates the movement of the autonomous robot 110. In particular, the scheduler 120 schedules the robot 110 to be available at the interchange 108 to receive the one or more items.

The scheduler 120 may send an autonomous robot 110 to the interchange 108 at the time an order is placed, to await delivery of the order. This process involves the robot 110 being out of service until the order arrives at the interchange 108. Thus the robot 110 may not be available to fulfil other tasks, such as delivery of other supplies to a hotel room. In addition, given a chronological sequence in which orders are placed, a later-placed order may arrive earlier than an earlier-placed order. The robot 110 should then be configured to deliver the later-placed order and then return to the interchange 108 to accept the earlier-placed order.

The scheduler 120 may instead await arrival of the one or more items at the interchange 108 before sending the robot 110 to the interchange 108. For some products, such as food and beverage, temperature is important. It may therefore be undesirable to await confirmation of arrival of the one or more products at the interchange 108 since the time taken for the robot 110 to reach the interchange 108, accept the one or more products and subsequently deliver those products (e.g. to an hotel room), may result in undesirable cooling of hot foods and beverages, and warming of cold foods and beverages.

The scheduler 120 may be in communication with a tracking system 124 through which the location of the one or more items can be tracked. Such tracking systems are currently employed to determine the location of taxis and can be used to track the location of, for example, a delivery van or other transport entity. The tracking system 124 may rely on a global positioning system (GPS) signal to identify the location of the transport entity and/or of the one or more products.

By understanding the location of the transport entity 106 the scheduler 120 can schedule the robot 110 to move to the interchange 108 once the transport entity 106 is within a particular distance from the interchange 108 (e.g. 5 kilometres). Where the tracking system 124 provides an approximate time to delivery, the scheduler 120 may schedule the robot 110 to move to the interchange 108 when the transport entity 106 is a particular time from arriving at the interchange 108 (e.g. 5 minutes away). Where the scheduler 120 knows the location of the robot 110, and the time taken for the robot 110 to travel from its current location to the interchange 108 (Time A), as well as the time taken for the one or more products to arrive at the interchange 108 with the transport entity (Time B), the scheduler 120 may arrange for the robot 110 to move to the interchange when Time A is equal to Time B.

The above options enable scheduling of robot movements based on incoming tracking data. The scheduler 120 may similarly be able to send outgoing data to the tracking system 124 or to the transport entity 106 itself. In the event that no robot 110 is going to be available until an estimated or known time, the scheduler 120 may send a signal to the tracking system 124 or transport entity 106 advising them that delivery need not be made at the interchange 108 before the estimated or known time. For example, where a robot 110 will not be available for another 30 minutes or until a particular time (e.g. 5 pm), delivery need not be made earlier than 30 minutes from when the signal is sent or earlier than the particular time.

The scheduler 120 may also be capable of transmitting traffic and route updates to the tracking system 124 or transport entity 106, to allow the transport entity 106 to take a different route than an intended or default route in order to avoid bad traffic areas, accidents, and the like. The scheduler 120 may also have access to delivery location information of one or more other deliveries the transport entity 106 intends to make, and thus provide a recommended route to delay arrival at the interchange 108 in the event that a robot 110 will not be available at the interchange 108 for an estimated or known period of time.

The order management system 102—particularly the scheduler 120—provides the destination (which may be represented by destination information by which the autonomous delivery robot can navigate to the destination) 111 to the robot 110 so the robot 110 can autonomously navigate to the destination. The destination, as shown on a particular order, may be complete (e.g., for an order being delivered to a hotel guest, the order may comprise the room number) or may be augmented with information known to the order management system 102, but not to the product provider 104 or transport entity 106. For example, the destination as shown on the order may be augmented with hotel room information so that the transport entity or product provider only needs to know the address of the hotel, and the order management system will advise the robot of the hotel room to which the one or more products should be delivered.

The order management system 102 may be a cloud server, a courier—enabling easy integration of route updating functionalities discussed with reference to the scheduler 120—, a vending machine, a server of the host business providing the interchange or any other server system.

The product provider 104 may be one of a group of merchants from whom purchases may be made and delivered in accordance with present methods. For example, where the recipient is a hotel guest, the hotel may have established relationships with one or more food and beverage providers (product providers) from whom an order may be placed for meal delivery. Alternatively, the product provider 104 may be any supplier/provider of any product.

The transport entity 106 may be any mode of transport by which the one or more products can be sent from the product provider 104 to the interchange 108. The product provider 104 is a party (e.g., a business) located remotely from the interchange 108 such that the transport entity 106 must courier the one or more products to the interchange 108. The transport entity may be, for example, a courier or drone. The transport entity 106 may be owned by or affiliated (e.g., have a business relationship) with the product provider 104. Alternatively, where the recipient is a hotel guest the transport entity 106 may be owned by or affiliated with the hotel.

The delivery interchange 108 is a location at which the one or more products are moved from the transport entity 106 and are provided to the autonomous robot 110. The interchange 108 may comprise a physical space or location at which the transport entity 106 (e.g., a person operating as a courier) loads the one or more products into or onto the robot 110. The interchange 108 may comprise a cache or temporary storage for the one or more products. The delivery interchange 108 may comprise means for electronically confirming receipt of the one or more products from the transport entity. For example, the interchange 108 may comprise a barcode scanner for scanning a barcode on a package containing the one or more products, or scanning the barcodes of the one or more products themselves. The interchange 108 may further comprise a quick-response (QR) code scanner to identify the order as it arrives from the transport entity. Similarly, the interchange 108 may scan the order as it is loaded, automatically or otherwise, onto or into the autonomous delivery robot 110. The interchange 108 may therefore store a reference number for the robot 110 in a database along with the receipt number of the order so as to maintain a record of which robot 110 was used to deliver which order. Similarly, the interchange 108 may apply one or more timestamps to record one or more of:

(i) when the order was placed;
(ii) when the order was picked up from the product provider or providers, by the transport entity 106;
(iii) when an order arrived from the transport entity 106 at the interchange 108;
(iv) when the autonomous robot 110 picked it up from the interchange 108;
(v) when the autonomous robot 110 arrived at the destination; and
(vi) when the order was verified as delivered or not delivered.

This tracking of timestamps enables the order management system 102 to determine if the product provider or providers delayed in supplying the product(s) to the transport entity 106, whether the transport entity 106 took too long to deliver the product(s), whether the host business, or the robot performing its operation for the host business, took too long to deliver the product(s) and whether the recipient took too long to accept the product(s). Delays are particularly important whether hot, cold or otherwise perishable goods are being delivered and the recipient states the order was incomplete (e.g., arrived at the wrong temperature or had otherwise spoiled).

The scheduler 120 may be aware of multiple orders arriving, and may instruct the robot 110 to wait at the interchange 108 for receipt of more than one order.

The autonomous delivery robot 110 may be a robot as discussed in U.S. 2015/0242806. The autonomous delivery robot is configured with an interface, as previously discussed, for verifying completion of delivery of the one or more products. The autonomous delivery robot 110 further comprises payment integration to facilitate payment upon delivery, or to confirm release of funds paid (or held) upon placement of the order.

Where the autonomous delivery robot 110 is expected to deliver third party food and beverage, or other goods that may be temperature controlled, the autonomous delivery robot 110 may comprise one or both of a heated compartment in which hot foods, beverages and other products can be placed, and a cold compartment in which cold foods, beverages and other products can be placed. The temperature of the hot and/or cold compartment may be set to a predetermined temperature by the order management system 102 supplying control instructions to the autonomous robot 110—note: the robot is autonomous in the sense that it can deliver products unaided and without remote control but it does not mean the autonomous robot receives no control signals that advise the robot of, for example, the temperature at which to set one or more compartments in which products are carried, the destination or location within a host business (discussed with reference to FIG. 3) to which the products are to be delivered, route information from the interchange to the destination or location and other control commands. The predetermined temperature may depend on the nature of the products intended to be delivered—for example, for transporting coffee the heated compartment may be a first predetermined temperature, and for delivering a hot meal the heated compartment may be a second predetermined temperature that is lower than the first predetermined temperature.

Figure 2:
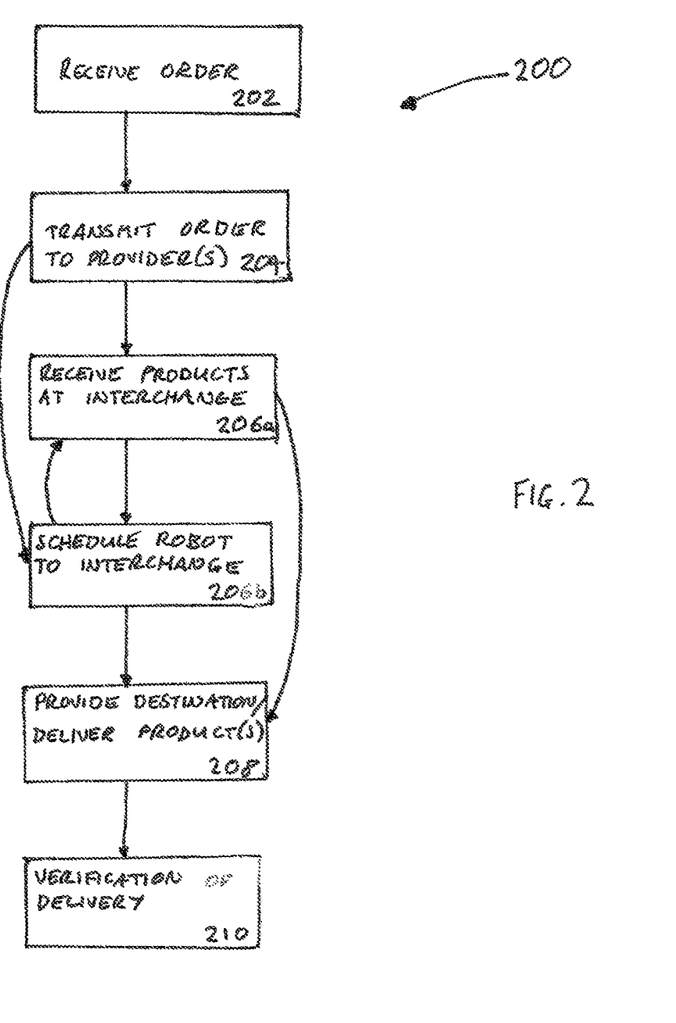
FIG. 2 shows a method for managing item delivery using the system of FIG. 1.

FIG. 2 illustrates a method 200 for managing item delivery. The delivery may be made to a hotel room. The method broadly comprises:
  Step 202: receiving an order through the order terminal;
  Step 204: submitting the order to the product provider or product providers;
  Step 206a: product(s) delivered to interchange;
  Step 206b: robot routed to interchange to accept product(s);
  Step 208: delivery of product(s) by robot; and
  Step 210: verification or confirmation of successful delivery.

At step 202 an order is received through an order terminal. The order may be made using standard online purchase mechanisms, or any other order method.

Once the order is placed, it is submitted to one or more product providers (step 204). The submission may be made by sending the order using any appropriate transmission method, including facsimile, email, completing an online order submission form and processing an order through a payment gateway.

Steps 206a and 206b may occur in any order, or concurrently. Under step 206a the one or more products are delivered by a transport entity to the interchange. Under step 206b the autonomous robot is routed to the interchange to pick up the one or more products for delivery. The order management system (reference 308 in FIG. 3) may also be used to aggregate delivery of items or products from multiple merchants. This can reduce the number of delivery jobs required of the autonomous delivery robots. For example, the order management may identify common information relating to two or more orders—such as common payment credentials, room number or customer name—and schedule a robot to await delivery of all relevant items before making delivery. Similarly the order management system may identify that two deliveries are being delivered to hotel rooms that are very close. The order management system may therefore schedule a robot to await delivery of both orders so that a single delivery job can be used to deliver the multiple deliveries to minimise travel to and from the interchange 108.

Step 208 involves delivery of the one or more products using the autonomous robot.

Step 210 involves verification of completion of delivery. That verification may comprise making payment or confirming payment for the one or more products. Additionally, where the order is incomplete (e.g. there are fewer products than the ordered number, the wrong product or products has or have been delivered, or a product is damaged) the recipient may not accept the delivery and thus decline the transaction. Where funds for payment for the one or more products have been barred or otherwise held, those funds may either be automatically released once the order management system is advised the order will be fulfilled, or may be held until it is confirmed the order is indeed incomplete (i.e., refund or release of funds to consumer) or complete (i.e., payment made to the product provider or providers).

Figure 3:
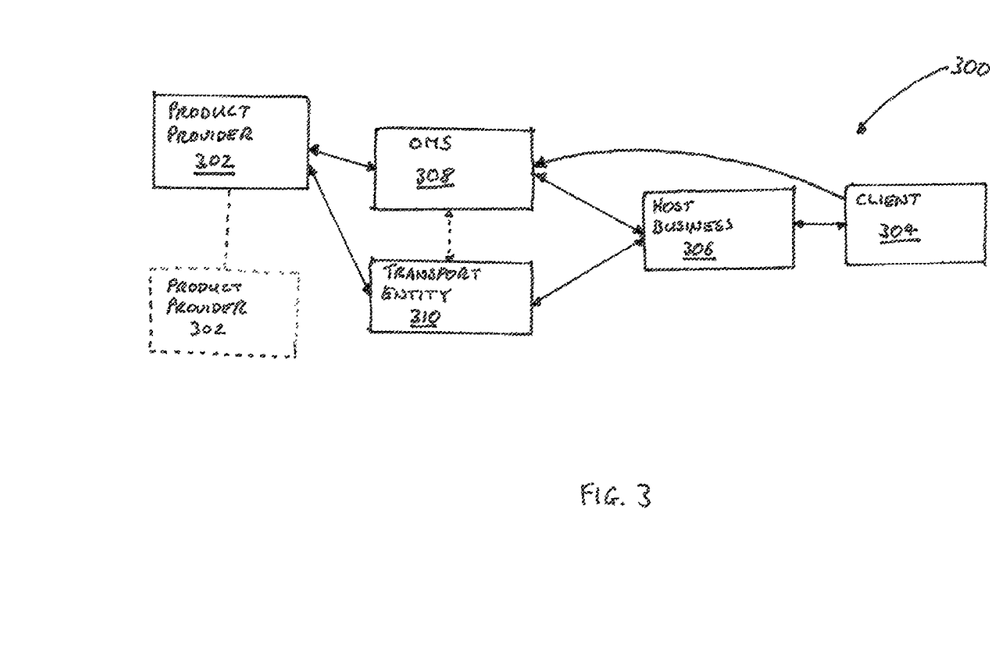
FIG. 3 shows a supply chain for managing item delivery.

FIG. 3 illustrates a supply chain 300 for delivering one or more items supplied by one or more product providers 302 to a client 304 of a host business 306. The supply chain 300 broadly comprises:
  the one or more product providers 302;
  an order management system 308;
  the host business 306;
  a transport entity 310; and
  the client 304.

In use, the client 304 (i.e., the recipient) places an order or the order is placed on their behalf. The order is received by the order management system 308 which routes the order to the relevant product provider or providers 302. The product provider or providers 302 gather the one or more products necessary to fulfil the order and provide it to the transport entity 310 along with the destination (e.g., the address of the host business 306). The transport entity 310 delivers the one or more products from the one or more product providers 302 to the host business 306. Using an autonomous robot the host business 306 delivers the one or more products to the client 304.

The one or more product providers 302 may be suppliers/providers of any sort of product. For example, where the host business 306 is a hotel, the one or more product providers 302 may comprise food and beverage companies providing food and beverage products for delivery to the hotel.

As mentioned with reference to FIG. 1, the order management system 308 comprises:
  an order terminal for receiving the order from the client 304;
  a transmitter for sending the order to the one or more product providers;
  a verification terminal by which a recipient (i.e. client 304) can verify completion of delivery of the one or more items to the destination (e.g. client's hotel room where the host business is a hotel); and
  a scheduler for managing movements of one or more autonomous robots. The scheduler may also have the capacity to communicate with one or both of the transport entity 310 and one or more product providers 302 to product route and robot availability updates and/or recommended delivery routes.

The particular components of the order management system, as listed above, are described with reference to FIG. 1 and that description applies equally to the order management system 308 as shown in FIG. 3.

The host business 306 can be any business capable of hosting a client 304 in other words, at which the client can reside or stay for a period of time. The host businesses 306 include, by way of non-limiting example, hotels, short-stay accommodation, managed condominiums, serviced office space, office buildings, malls (e.g., where the mall operator is the host business 306 and the clients 304 are businesses within the mall).

The host business 306 may broadly include:

an interchange—such as interchange 108 described with reference to FIG. 1—for taking delivery of the one or more items from the transport entity 310;

an autonomous delivery robot—such as robot 110 described with reference to FIG. 1—for receiving the one or more items at the interchange and autonomously delivering the one or more items to the destination (e.g., hotel room, residence, mall location, office location (even to an individual office within a business operating in an office tower)); and a scheduler for scheduling the robot to be available at the interchange for receipt and delivery of the one or more items, and for providing destination location information to the robot by which the robot can autonomously navigate to the destination.

The host business 306 may further include the order management system 308 and/or the transport entity 310. For example, where the host business 306 is a hotel it may provide dry cleaning services for guests. The dry cleaning order may be placed with the order management system 308, the hotel may send the dry cleaning in one of its own vehicles, or an otherwise vehicle designated for use by that hotel, to the dry cleaning business (i.e., product provider 302—the product being dry cleaning services or the dry cleaned clothes resulting from those services), and the dry cleaning business, may return the dry cleaned clothes to the hotel using the same vehicle.

The transport entity 310 again receives the one or more items from the one or more product providers 302 and delivers the one or more items to the host business 306. As mentioned above, the transport entity may also collect items from the host business 306 and take them from the host business 306 to the one or more product providers 302.

Figure 4:
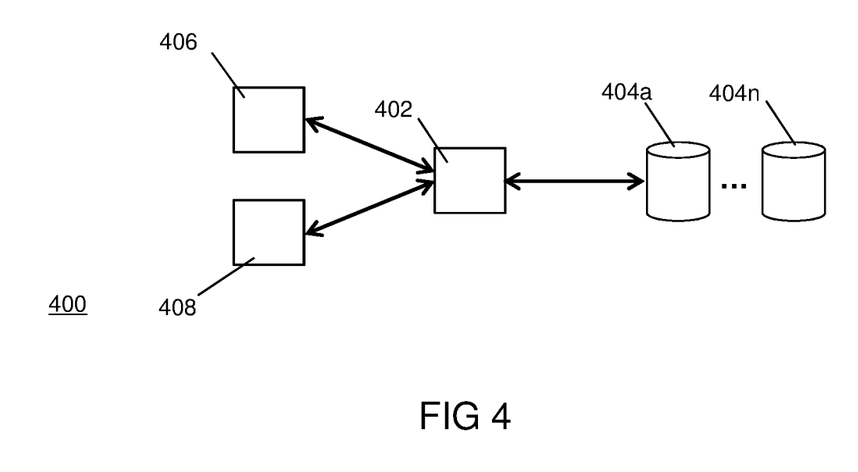
FIG. 4 shows a schematic of a system for performing the methods of FIGS. 1 and 3.

FIG. 4 shows a schematic of a network-based system 400 for managing item delivery according to an embodiment of the disclosure. The system 400 comprises a computer 402, one or more databases 404a . . . 404n, a user input module 406 and a user output module 408. Each of the one or more databases 404a . . . 404n are communicatively coupled with the computer 402. The user input module 406 and a user output module 408 may be separate and distinct modules communicatively coupled with the computer 402. Alternatively, the user input module 406 and a user output module 408 may be integrated within a single mobile electronic device (e.g. a mobile phone, a tablet computer, etc.). The mobile electronic device may have appropriate communication modules for wireless communication with the computer 402 via existing communication protocols.

The computer 402 may comprise: at least one processor; and at least one memory including computer program code; the at least one memory and the computer program code configured to implement the functions of one or more of the order terminal, transmitter, scheduler and verification terminal.

The autonomous robot 110, or the verification terminal installed thereon, may be configured to directionally locate the recipient and move the robot to the recipient or, in the case of a robot, to face the recipient.

The verification module may comprise a recipient authentication system. The recipient authentication system may be configured to receive a speech segment from the recipient and analyse the speech segment to locate identifying information in the speech segment. The identifying information may be located using known voice biometric analysis.

As described above, the recipient authentication system may be configured with facial recognition and/or gesture recognition technology, or may also be configured to interact with persistent authentication devices to authenticate the recipient, such as a device worn by the recipient which monitors one or more biometric parameters (e.g., heartbeat) of the recipient.

The verification terminal of the order management system may be configured to accept payment for the order. To that end, the verification terminal may comprise one or more of a magnetic stripe reader, a near-field communications (NFC) chip reader, a biometric marker reader, a Bluetooth™ (e.g., Bluetooth™ low-energy) pairing capability (e.g., to accept payment vehicle details from a digital wallet installed on a recipient's mobile device), QR-code scanner (e.g., to scan a QR-code from a digital wallet, the QR-code representing the recipient's payment vehicle details) and an interface for inputting identification and payment vehicle details. The robot may also supply a QR-code or other identifier or signal for scanning using a digital wallet app on the recipient's mobile device, the recipient's digital wallet processing settlement and sending confirmation of settlement to the merchant. The recipient's digital wallet may then produce a similar identifier or signal to confirm payment, or the order management system may receive confirmation of payment (e.g., from the acquirer through whom settlement was affected) and send that confirmation to the robot.

The computer 402, such as when it comprises the order management system, may be in communication with a payment network (such as BANKNET of MasterCard® International Incorporated) to effect payment for the order upon verification of delivery by the recipient.

The computer 402, providing the functionality of the verification terminal, may be configured to receive notification from the recipient that the order was not delivered. The computer may present options for the recipient to specify that the order was not delivered because one or items were absent from the delivery, at least one item was damaged or at least one item not arriving in the expected condition.

The computer 402 may comprise the entire order management system, or may provide interconnectivity between components of that system and a server of the host business so as to associate a location within the host business (e.g., a hotel room with a hotel) with the destination (e.g., the address of the hotel) provided in the order. The order management system may be configured to augment the destination with the location within the host business, and provide the augmented destination to the robot. The robot can then be configured to travel to the location within the host business for delivery of the one or more items to the recipient, rather than to an approximate location at which the recipient must travel to meet the robot.

The various types of data, e.g., order records, recipient preferences (e.g., preferred payment method, preferred biometric authentication method and the biometric markers sought to be scanned), recipient payment vehicle details, destination and location details, mappings between destination and location etc., can be stored on a single database (e.g., 404a), or stored in multiple databases (e.g., recipient preference details can be stored on database 404a, payment vehicle credentials can be stored on database 404n, etc.). The databases 404a . . . 404n may be realized using cloud computing storage modules and/or dedicated servers communicatively coupled with the computer 402.

Figure 5:
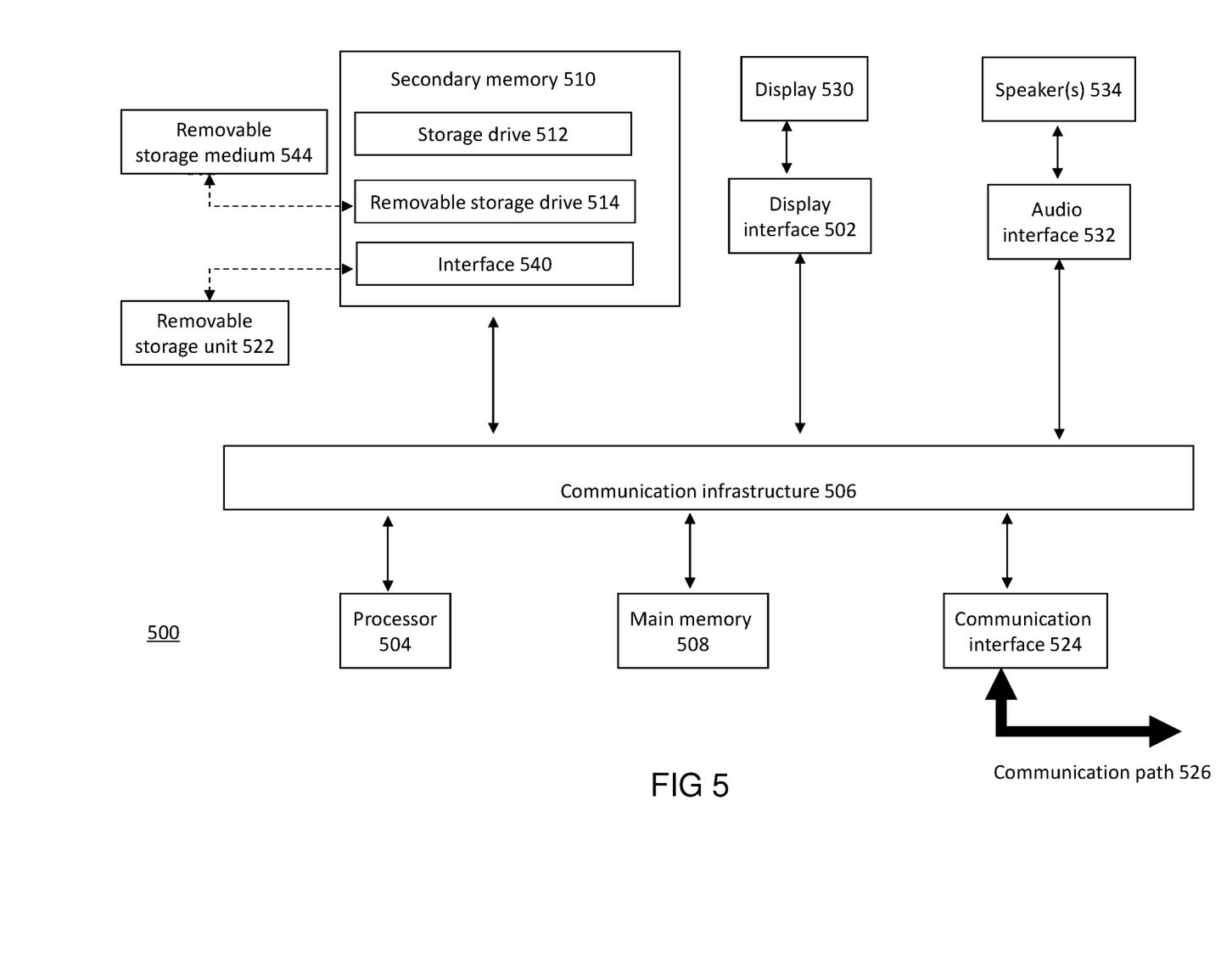
FIG. 5 shows an exemplary computing device suitable for executing the methods of FIGS. 1 and 3.

FIG. 5 depicts an exemplary computer/computing device 500, hereinafter interchangeably referred to as a computer system 500, where one or more such computing devices 500 may be used to facilitate execution of the above-described method for managing item delivery. In addition, one or more components of the computer system 500 may be used to realize the computer 402. The following description of the computing device 500 is provided by way of example only and is not intended to be limiting.

With reference to the method 200 of FIG. 2, the at least one processor, and at least one memory including computer program code, the at least one processor, memory and the computer program code being configured to cause the computer to: (A) receive an order through the order terminal—step 202; (B) submit (i.e., transmit) the order to one or more product providers who can fulfil the order—step 204; (C) receive the products at the interchange—step 206a—and schedule a robot to pick up the products from the interchange—step 206b; (D) provide destination information (augmented or otherwise) to the robot to facilitate delivery of the one or more products to the recipient; and (E) receive verification of completion of delivery or non-completion of delivery.

As shown in FIG. 5, the example computing device 500 includes a processor 504 for executing software routines. Although a single processor is shown for the sake of clarity, the computing device 500 may also include a multi-processor system. The processor 504 is connected to a communication infrastructure 506 for communication with other components of the computing device 500. The communication infrastructure 506 may include, for example, a communications bus, cross-bar, or network.

The computing device 500 further includes a main memory 508, such as a random access memory (RAM), and a secondary memory 510. The secondary memory 510 may include, for example, a storage drive 512, which may be a hard disk drive, a solid state drive or a hybrid drive and/or a removable storage drive 514, which may include a magnetic tape drive, an optical disk drive, a solid state storage drive (such as a USB flash drive, a flash memory device, a solid state drive or a memory card), or the like. The removable storage drive 514 reads from and/or writes to a removable storage medium 544 in a well-known manner. The removable storage medium 544 may include magnetic tape, optical disk, non-volatile memory storage medium, or the like, which is read by and written to by removable storage drive 514. As will be appreciated by persons skilled in the relevant art(s), the removable storage medium 544 includes a computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 540. Examples of a removable storage unit 522 and interface 540 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 522 and interfaces 540 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments of the disclosure, the communication interface 524 permits data to be transferred between the computing device 500 and a data communication network, such as a public data or private data communication network. The communication interface 524 may be used to exchange data between different computing devices 500 which such computing devices 500 form part of an interconnected computer network. Examples of a communication interface 524 can include a modem, a network interface (such as an Ethernet card), a communication port (such as a serial, parallel, printer, GPIB, IEEE 1393, RJ45, USB), an antenna with associated circuitry, and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

As shown in FIG. 5, the computing device 500 further includes a display interface 502 which performs operations for rendering images to an associated display 530 and an audio interface 532 for performing operations for playing audio content via associated speaker(s) 534.

As used herein, the term "computer program product" may refer, in part, to removable storage medium 544, removable storage unit 522, a hard disk installed in storage drive 512, or a carrier wave carrying software over communication path 526 (wireless link or cable) to communication interface 524. Computer readable storage media refers to any non-transitory, non-volatile tangible storage medium that provides recorded instructions and/or data to the computing device 500 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 500. Examples of transitory or non-tangible computer readable transmission media that may also participate in the provision of software, application programs, instructions and/or data to the computing device 500 include radio or infra-red transmission channels as well as a network connection to another computer or networked device, and the Internet or Intranets including e-mail transmissions and information recorded on Websites, and the like.

The computer programs (also called computer program code) are stored in main memory 508 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 504 to perform features of the above-described embodiments. Accordingly, such computer programs represent controllers of the computer system 500.

Software may be stored in a computer program product and loaded into the computing device 500 using the removable storage drive 514, the storage drive 512, or the interface 540. Alternatively, the computer program product may be downloaded to the computer system 500 over the communications path 526. The software, when executed by the processor 504, causes the computing device 500 to perform functions of embodiments described herein.

It is to be understood that the embodiment of FIG. 5 is presented merely by way of example. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

It will be appreciated that the elements illustrated in FIG. 5 function to provide means for performing the computer implemented method as described with respect to FIG. 2, achieving the system embodiments as shown in FIGS. 1 and 3. For example, the computing device 500 provides an apparatus for performing a method for managing item delivery, the system or apparatus thereby serving to control, for example, a supply chain to facilitate delivery of one or more items. The apparatus or system may accordingly comprise: at least one processor 504, at least one memory 508 including computer program code and at least one communication interface 524, as discussed above.

The at least one memory 508 and the computer program code are configured to, with at least one processor 504, cause the apparatus at least to: receive an order for one or more items or products, submit or transmit the order to one or more suppliers/providers of the one or more products, receive the one or more products at the interchange, schedule an autonomous robot to pick up the one or more products from the interchange, provide the autonomous robot the destination of the recipient to enable the autonomous robot to deliver the one or more products to the recipient, and receive verification of completion (or non-completion) of delivery.

The at least one memory 508 and the computer program code may further be configured to cause the at least one processor 504 to authenticate the recipient via interaction with the robot or verification terminal installed thereon, to determine an identity of the recipient.

The at least one memory 508 and the computer program code are further configured to cause the at least one processor 504 to initiate an order completion or non-completion sequence—for example, through the verification terminal—which, upon confirmation from the recipient, advises the order management system of the completion or non-completion of the order.

The computing device 500 of FIG. 5 may execute the process shown in FIG. 2 when the computing device 500 executes instructions which may be stored in any one or more of the removable storage medium 544, the removable storage unit 522 and storage drive 512. These components 522, 544 and 512 provide a non-transitory computer readable medium having stored thereon executable instructions for controlling a computer to perform steps for managing item delivery comprising: receiving an order, transmitting an order, receiving products at an interchange (or recording receipt of such products), scheduling a robot to pick up the products, providing a destination to the robot for autonomous delivery of the products and receiving verification of completion of delivery.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

With that said, and as described, it should be appreciated that one or more aspects of the present disclosure transform a general-purpose computing device (or computer) into a special-purpose computing device when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for managing item delivery, the system comprising:
    an order management system including:
        an order terminal configured to receive an order from a communication device associated with a user, the order comprising a request for delivery of one or more items to a destination;
        a transmitter configured to receive the order from the order terminal and send the order to one or more product providers for providing the one or more items; and
        a scheduler;
    a delivery interchange arranged to take delivery of the one or more items from a transport entity, the transport entity arranged to receive the one or more items from the one or more product providers; and
    an autonomous delivery robot configured to:
        receive the one or more items at the delivery interchange; and
        deliver the one or more items to the destination,
    wherein the autonomous delivery robot includes a verification terminal configured to:
        receive a verification from a recipient indicating that the delivery of the one or more items to the destination is complete; and
        authenticate the recipient of the one or more items at the destination based on a biometric of the recipient,
    wherein the scheduler is configured to, based on a time to the delivery of the one or more items, schedule the autonomous delivery robot to be available at the delivery interchange to receive the one or more items; and
    wherein the order management system is configured to:
        upon receipt of the order, associate the destination with an identifier indicative of the order;
        when the delivery interchange takes the delivery of the one or more items associated with the order, map the identifier indicative of the order back to the destination; and
        provide the destination to the autonomous delivery robot, wherein the autonomous delivery robot is configured to autonomously navigate to the provided destination to thereby deliver the one or more items to the destination.

2. The system of claim 1, wherein the order management system is configured to associate the destination with a location within a host business.

3. The system of claim 2, wherein the order management system is further configured to:
    augment the destination with the location within the host business; and
    provide the augmented destination to the autonomous delivery robot;
    wherein the autonomous delivery robot is configured to travel to the location within the host business for delivery of the one or more items to the recipient.

4. The system of claim 1, wherein the verification terminal includes a recipient authentication system.

5. The system of claim 4, wherein the recipient authentication system is configured to perform recipient biometric authentication.

6. The system of claim 5, wherein the recipient biometric authentication includes one or more of fingerprint authentication, facial recognition, speech recognition, and/or eye recognition.

7. The system of claim 1, wherein the verification terminal is configured to accept payment for the order.

8. The system of claim 7, wherein the verification terminal includes one or more of a magnetic stripe reader, a near-field communications (NFC) chip reader, a biometric marker reader, and/or an interface for inputting identification and payment vehicle details.

9. The system of claim 1, wherein the order management system is in communication with a payment network and is configured to effect payment for the order upon verification of delivery by the recipient.

10. The system of claim 1, wherein the verification terminal is configured to receive notification from the recipient that the order was not delivered.

11. The system of claim 10, wherein the verification terminal is configured to receive notification from the recipient that the order was not delivered, when at least one item is absent from the delivery, at least one item is damaged, and/or at least one item does not arrive in an expected condition.

12. An order management system for managing receipt of an order for one or more items to be delivered to a destination, the order management system comprising:
    an order terminal configured to receive an order, the order comprising a request for delivery of one or more items to a destination;
    a transmitter configured to receive the order from the order terminal and send the order to one or more product providers for providing the one or more items;
    an autonomous delivery robot, the autonomous delivery robot including a verification terminal configured to:
        receive a verification from a recipient indicating that delivery of the one or more items to the destination is complete; and
        authenticate the recipient in connection with the delivery; and
    a scheduler configured to schedule the autonomous delivery robot to collect the one or more items at a delivery interchange;
    wherein the order management system is configured to transmit, to the autonomous delivery robot, destination information, and wherein the autonomous delivery robot is configured to autonomously navigate to the destination based on the destination information to thereby deliver the one or more items to the destination.

13. The order management system of claim 12, wherein the scheduler is configured to schedule the autonomous delivery robot to be available at the interchange to receive the one or more items.

14. The order management system of claim 12, wherein the order management system is in communication with a payment network to effect payment for the order upon verification of delivery by the recipient.

15. A network for managing item delivery, the network comprising:
    an order management system including:
        an order terminal configured to receive an order, the order comprising a request for delivery of the one or more items to a destination;
        a transmitter configured to send the order to one or more product suppliers of the one or more items, the one or more product suppliers arranged to receive the order and supply the one or more items; and
        a scheduler;
    a host including:

an interchange arranged to take delivery of the one or more items from the one or more product suppliers; and an autonomous delivery robot configured to receive the one or more items at the interchange and autonomously deliver the one or more items to the destination, wherein the autonomous delivery robot includes a verification terminal configured to:
  receive a verification from a recipient indicating that the delivery of the one or more items to the destination is complete; and
  authenticate the recipient of the one or more items at the destination based on a biometric of the recipient; and wherein the scheduler is configured to:
  schedule the autonomous delivery robot to be available at the interchange for receipt and delivery of the one or more items; and
  provide destination location information to the autonomous delivery robot, wherein the autonomous delivery robot is configured to autonomously navigate to the destination based on the destination location information to thereby deliver the one or more items to the destination.

16. The network of claim 15, wherein the order management system is configured to associate the destination with a location within a host business.

17. The network of claim 16, wherein the order management system is further configured to:
  augment the destination with the location within the host business; and
  provide the augmented destination to the autonomous delivery robot;
  wherein the autonomous delivery robot is configured to travel to the location within the host business for delivery of the one or more items to the recipient.

18. The network of claim 15, wherein the verification terminal comprises a recipient authentication system.

19. The system of claim 1, wherein the user is the recipient.

* * * * *